United States Patent
Sharifi et al.

(10) Patent No.: US 12,074,517 B2
(45) Date of Patent: Aug. 27, 2024

(54) DC-DC CONVERTER WITH OUT-OF-AUDIO CIRCUIT

(71) Applicant: Texas Instruments Incorporated, Dallas, TX (US)

(72) Inventors: Reza Sharifi, Sunnyvale, CA (US); Timothy Patrick Pauletti, Dallas, TX (US); Keliu Shu, Frisco, TX (US); Mark Baxter Weaver, Grants Pass, OR (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/137,086

(22) Filed: Dec. 29, 2020

(65) Prior Publication Data

US 2022/0209669 A1   Jun. 30, 2022

(51) Int. Cl.
*H02M 3/156* (2006.01)
*H02M 1/00* (2006.01)
*H02M 3/157* (2006.01)
*H02M 1/14* (2006.01)
*H02M 3/158* (2006.01)

(52) U.S. Cl.
CPC ....... *H02M 3/1563* (2013.01); *H02M 1/0032* (2021.05); *H02M 3/156* (2013.01); *H02M 3/157* (2013.01); *H02M 1/14* (2013.01); *H02M 3/1582* (2013.01)

(58) Field of Classification Search
CPC ..... H02M 3/155–1588; H02M 1/0032; H02M 3/1563; H02M 3/156; H02M 3/157; H02M 1/14; H02M 3/1582
See application file for complete search history.

(56) References Cited

U.S. PATENT DOCUMENTS

| | | | | |
|---|---|---|---|---|
| 5,973,368 | A * | 10/1999 | Pearce | H03F 3/217 257/337 |
| 6,121,747 | A * | 9/2000 | Trachtenberg | H02P 23/186 388/805 |
| 6,215,288 | B1 * | 4/2001 | Ramsey | H02M 3/1588 323/224 |
| 9,252,757 | B2 * | 2/2016 | Chao | H03K 4/90 |
| 9,923,520 | B1 * | 3/2018 | Abdelfattah | H03F 3/245 |
| 9,991,775 | B1 * | 6/2018 | Lin | H02M 3/156 |
| 10,122,278 | B1 * | 11/2018 | Xue | H02M 3/158 |
| 10,715,039 | B1 * | 7/2020 | Ilango | G01R 19/175 |
| 10,826,396 | B1 * | 11/2020 | Wu | H02M 3/158 |

(Continued)

*Primary Examiner* — Yusef A Ahmed
(74) *Attorney, Agent, or Firm* — John R. Pessetto; Frank D. Cimino

(57) ABSTRACT

A DC-DC regulator system includes a power circuit which has a first input coupled to receive an input voltage, a second input coupled to receive a control signal and an output to provide a regulated output voltage. The system includes a control circuit which has a first input coupled to receive the regulated output voltage, a second input coupled to receive a reference voltage, a first output to provide the control signal, and a second output to provide a converter clock signal. The system includes an out-of-audio circuit which has a first input coupled to receive a minimum threshold frequency signal, a second input coupled to receive the converter clock signal, a third input coupled to the power circuit output, and a fourth input coupled to receive a bandwidth control clock signal.

12 Claims, 3 Drawing Sheets

(56) References Cited

U.S. PATENT DOCUMENTS

| | | | | |
|---|---|---|---|---|
| 10,845,833 B1* | 11/2020 | Dietrich | ............... | H02M 3/157 |
| 10,862,472 B1* | 12/2020 | Zannoth | ............... | H03K 17/063 |
| 10,917,012 B1* | 2/2021 | Heiling | ............... | H02M 3/156 |
| 11,152,861 B2* | 10/2021 | Chen | ............... | H02M 3/1563 |
| 2002/0190701 A1* | 12/2002 | Miyazaki | ............... | H02M 3/1588 |
| | | | | 323/284 |
| 2005/0052168 A1* | 3/2005 | Tazawa | ............... | H02M 3/1584 |
| | | | | 323/282 |
| 2005/0116697 A1* | 6/2005 | Matsuo | ............... | H02M 3/1584 |
| | | | | 323/282 |
| 2005/0219776 A1* | 10/2005 | Yamashita | ............... | H02M 3/33523 |
| | | | | 361/18 |
| 2005/0243894 A1* | 11/2005 | Chen | ............... | H02M 3/156 |
| | | | | 375/139 |
| 2006/0125454 A1* | 6/2006 | Chen | ............... | H02M 3/1588 |
| | | | | 323/282 |
| 2007/0210772 A1* | 9/2007 | Sawtell | ............... | H02M 3/156 |
| | | | | 323/282 |
| 2007/0242777 A1* | 10/2007 | Suzuki | ............... | H04N 21/4348 |
| | | | | 348/E5.122 |
| 2011/0062926 A1* | 3/2011 | Qiu | ............... | H02M 3/1588 |
| | | | | 323/282 |
| 2011/0109398 A1* | 5/2011 | Tang | ............... | H03K 7/08 |
| | | | | 332/110 |
| 2011/0175584 A1* | 7/2011 | Huber | ............... | H02M 3/158 |
| | | | | 323/282 |
| 2012/0133348 A1* | 5/2012 | Fan | ............... | H02M 3/1588 |
| | | | | 323/284 |
| 2012/0146599 A1* | 6/2012 | Oyama | ............... | H02M 3/1588 |
| | | | | 330/260 |
| 2013/0021009 A1* | 1/2013 | Waltman | ............... | H02M 3/1584 |
| | | | | 323/271 |
| 2013/0181523 A1* | 7/2013 | Zhang | ............... | H05B 45/38 |
| | | | | 307/35 |
| 2013/0223650 A1* | 8/2013 | Takida | ............... | H03F 3/181 |
| | | | | 323/311 |
| 2015/0061626 A1* | 3/2015 | Archibald | ............... | G06F 1/26 |
| | | | | 323/282 |
| 2015/0077082 A1* | 3/2015 | Kilic | ............... | H02M 1/32 |
| | | | | 323/284 |
| 2015/0084606 A1* | 3/2015 | Nakamura | ............... | H02M 3/156 |
| | | | | 323/246 |
| 2015/0091544 A1* | 4/2015 | Jayaraj | ............... | H02M 3/156 |
| | | | | 323/284 |
| 2015/0232029 A1* | 8/2015 | Grandy | ............... | H02M 1/44 |
| | | | | 323/283 |
| 2016/0294331 A1* | 10/2016 | Ivanov | ............... | H03F 3/45753 |
| 2017/0063227 A1* | 3/2017 | Nakamura | ............... | H02M 3/158 |
| 2017/0133933 A1* | 5/2017 | Houston | ............... | H02M 3/156 |
| 2017/0272116 A1* | 9/2017 | Yu | ............... | H04B 1/69 |
| 2018/0019671 A1* | 1/2018 | Li | ............... | H02M 1/00 |
| 2018/0048232 A1* | 2/2018 | Adell | ............... | H02M 3/158 |
| 2018/0131275 A1* | 5/2018 | Guan | ............... | H02M 3/156 |
| 2018/0191249 A1* | 7/2018 | Su | ............... | H02M 3/1588 |
| 2019/0028027 A1* | 1/2019 | Cho | ............... | H02M 1/44 |
| 2019/0058398 A1* | 2/2019 | Sharifi | ............... | H02M 3/06 |
| 2019/0058405 A1* | 2/2019 | Lazaro | ............... | H03K 7/08 |
| 2020/0127566 A1* | 4/2020 | Lazaro | ............... | H02M 1/0061 |
| 2020/0195154 A1* | 6/2020 | Mayell | ............... | H02M 1/083 |
| 2020/0228010 A1* | 7/2020 | Wiktor | ............... | H02M 3/157 |
| 2020/0259690 A1* | 8/2020 | Klemmer | ............... | H04L 27/148 |
| 2020/0310475 A1* | 10/2020 | Wang | ............... | H02M 1/14 |
| 2020/0355745 A1* | 11/2020 | Bogus | ............... | H02H 7/0833 |
| 2021/0083583 A1* | 3/2021 | Becker | ............... | H03K 5/24 |
| 2021/0091668 A1* | 3/2021 | Buhari | ............... | H02M 1/08 |
| 2021/0135593 A1* | 5/2021 | Feng | ............... | H02N 2/00 |
| 2021/0203238 A1* | 7/2021 | Wu | ............... | H02M 3/1584 |
| 2021/0242780 A1* | 8/2021 | Pahkala | ............... | H03K 7/08 |
| 2021/0273562 A1* | 9/2021 | Ozalevli | ............... | H02M 3/158 |

\* cited by examiner ical Field

This description relates generally to switch mode regulators.

BACKGROUND

Switch mode regulators (e.g., buck regulator, boost regulator) provide a regulated output voltage responsive to an input voltage. A switch mode regulator includes one or more switching transistors which are driven by variable pulses. In some instances the frequency of the pulses are variable (PFM—pulse frequency modulation), and in other instances the pulse width (or on time) may be variable (PWM—pulse width modulation). The variable width pulses control the duty cycle of the switching transistors to regulate the output voltage. A load such as a resistive load or an inductive load can be coupled to the output.

In operation, if there is a current present in an inductor coupled to the switching transistors, the regulator is operated in a continuous conduction mode (CCM) in which the switching transistors are turned on/off at a fixed frequency but with a varying duty cycle. If the current in the inductor falls to zero, the regulator is operated in a discontinuous conduction mode (DCM) in which the switching transistors are turned off.

If the current drawn by the load drops below a minimum threshold current, the output voltage rises. To reduce the output voltage, the regulator is operated in a PFM mode in which the duty cycle and the frequency are both varied. If the output voltage rises, the switching frequency is reduced, which reduces current supplied to the load. A drawback of the PFM mode is that the switching frequency may be reduced to the audio frequency range, thus causing the regulator to emit audible noise.

SUMMARY

In one aspect, a DC-DC regulator system includes a power circuit which includes a first input coupled to receive an input voltage, a second input coupled to receive a control signal and an output to provide a regulated output voltage. The system includes a control circuit which has a first input coupled to receive the regulated output voltage, a second input coupled to receive a reference voltage, a first output to provide the control signal, and a second output to provide a converter clock signal. The system includes an out-of-audio circuit which has a first input coupled to receive a minimum threshold frequency signal, a second input coupled to receive the converter clock signal, a third input coupled to the power circuit output, and a fourth input coupled to receive a bandwidth control clock signal. The out-of-audio circuit is configured to draw a portion of current from the power circuit output in response to the minimum threshold frequency signal, the converter clock signal and the bandwidth control signal.

In an additional aspect, the out-of-audio circuit includes a frequency comparison circuit which has a first input coupled to receive the converter clock signal and a second input coupled to receive the minimum threshold frequency signal. The frequency comparison circuit is configured to provide a logic high voltage at an output if the frequency of the converter clock signal is lower than the minimum threshold frequency and to provide a logic low voltage at the output if the frequency of the converter clock signal is higher than the minimum threshold frequency.

In an additional aspect, the out-of-audio circuit includes a counter which has a first input coupled to the output of the frequency comparison circuit and a rising-edge clock-triggered input coupled to receive the bandwidth control clock signal. The counter is configured provide a count value at an output, wherein the counter is configured to increment the count value responsive to the logic high voltage and to decrement the count value responsive to the logic low voltage.

In an additional aspect, the out-of-audio circuit includes a digital-to-analog converter which has an input coupled to receive the count value and an output to provide a gate signal.

In an additional aspect, the out-of-audio circuit includes a first NFET which has a drain, a source, and a gate. The drain of the first NFET is coupled to the gate, the gate and the drain are coupled to receive the gate signal, and the source is coupled to a ground terminal. The out-of-audio control circuit includes a second NFET which has a drain, a source, and a gate. The drain of the second NFET is coupled to the power circuit output, and the gate is coupled to receive the gate signal, and the source is coupled to the ground terminal. The first NFET is configured to mirror a current through the second NFET.

In an additional aspect, the out-of-audio circuit is configured to control the currents through the first and second NFETs by applying the gate signal to the first and second NFETs. Thus, the current pulled from the power circuit output is regulated by applying the gate signal to the first and second NFETs.

In an additional aspect, the control circuit has a first bandwidth and the out-of-audio circuit has a second bandwidth, wherein the out-of-audio circuit is configured to maintain a separation between the first and the second bandwidth.

In an additional aspect, a DC-DC regulator system includes a high-side switch coupled between a switching terminal and a regulated output voltage terminal and a low-side switch coupled between the switching terminal and a ground terminal. The high-side and low-side switches have respective gates. The system includes an inductor coupled between an input voltage terminal and the switching terminal. The system includes a high-side drive circuit which has an output coupled to the gate of the high-side switch and has an input. The system includes a low-side drive circuit which has an output coupled to the gate of the low-side switch and has an input. The system includes an error control circuit which has a first input coupled to a reference voltage terminal and a second input coupled to the regulated output voltage terminal and has an output. The system includes a frequency control circuit which has an input coupled to the output of the error control circuit and has an output. The system includes an oscillator which has an input coupled to the output of the frequency control circuit and has an output. The system includes a ramp generator which has an input coupled to the output of the oscillator and has an output. The system includes a modulator circuit which has a first input coupled to the output of the error control circuit and a second input coupled to the output of the ramp generator and has an output. The system includes a latch which has an input, an output, an inverted output, a rising-edge triggered clock input, and a reset input, wherein the input is coupled to a logic high voltage, the rising-edge triggered clock input is coupled to the output of the oscillator, the reset input is coupled to the output of the modulator circuit, the output is coupled to the input of the high-side drive circuit, and the inverted output is coupled to the input of the low-side drive circuit. The system includes an out-of-audio circuit which has a first input coupled to a minimum threshold frequency terminal, a second input coupled to the output of the oscillator, a third input coupled to the regulated output voltage terminal, and a fourth output coupled to receive a bandwidth control clock signal.

BRIEF DESCRIPTION OF THE DRAWINGS

The same reference numerals or other feature designation are used in the figures for the same or similar features.

DETAILED DESCRIPTION

Figure 1:
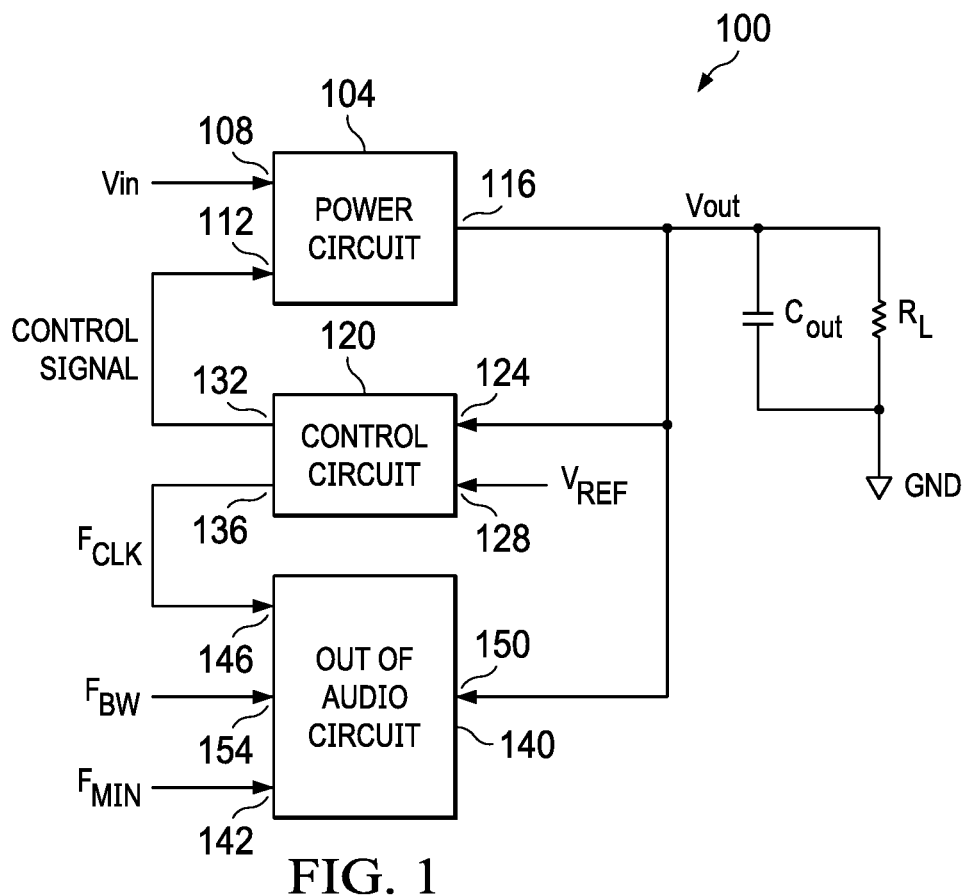
FIG. 1 is a block diagram of a DC-DC regulator system of an example embodiment.

FIG. 1 is a block diagram of a DC-DC regulator system 100 of an example embodiment. The DC-DC regulator system 100 can be a switch mode DC-DC converter, such as a buck converter, a boost converter, or a buck-boost converter. The system 100 includes a power circuit 104 which is driven by a control circuit 120. The power circuit 104 includes a first input 108 coupled to receive an input voltage Vin and a second input 112 coupled to receive a control signal. The power circuit 104 includes an output 116 to provide a regulated output voltage Vout. The power circuit output 116 is also referred to as the output of the regulator system 100. A capacitor $C_{out}$ is coupled between the output 116 and a ground terminal 118, and a load represented by a resistor $R_L$ is coupled between the output 116 and the ground terminal 118. The ground terminal 118 can be coupled to a ground or simply a common potential without actually connecting to ground.

The control circuit 120 has a first input 124 coupled to receive the regulated output voltage Vout and a second input 128 coupled to receive a reference voltage Vref. The control circuit 120 has a first output 132 to provide the control signal and a second output 136 to provide a converter clock signal $F_{CLK}$.

The system 100 includes an out-of-audio circuit 140 which has a first input 142 coupled to receive a minimum threshold frequency signal $F_{MIN}$, a second input 146 coupled to receive the converter clock signal $F_{CLK}$, a third input 150 coupled to the output 116, and a fourth input 154 coupled to receive a bandwidth control clock signal $F_{BW}$. The out-of-audio circuit 140 is configured to pull a portion of current from the output 116.

The control circuit 120 and the power circuit 104 forms a first loop (referred to as a control loop) which has a first bandwidth, and the out-of audio circuit 140 and the control circuit 120 forms a second loop (referred to as an out-of-audio loop) which has a second bandwidth. To ensure stability of the system 100, the frequency of the bandwidth control clock signal $F_{BW}$ is selected to be less than the frequency of $F_{CLK}$. Since the frequency of $F_{BW}$ determines the bandwidth of the second loop, there is a wide separation between the first bandwidth and the second bandwidth. Also, to prevent the regulator system 100 from operating within the audio frequency range, the minimum threshold frequency signal $F_{MIN}$ is selected to be higher than audio frequencies. As a result, the system 100 operates at a higher frequency than audio frequencies.

By way of example, the minimum threshold frequency $F_{MIN}$ can be set at 30 kHz, thus ensuring that the regulator system 100 operates above audio frequencies. The bandwidth control signal $F_{BW}$ can be set at 1 kHz, thus ensuring a wide separation between the first and the second bandwidth.

Figure 2:
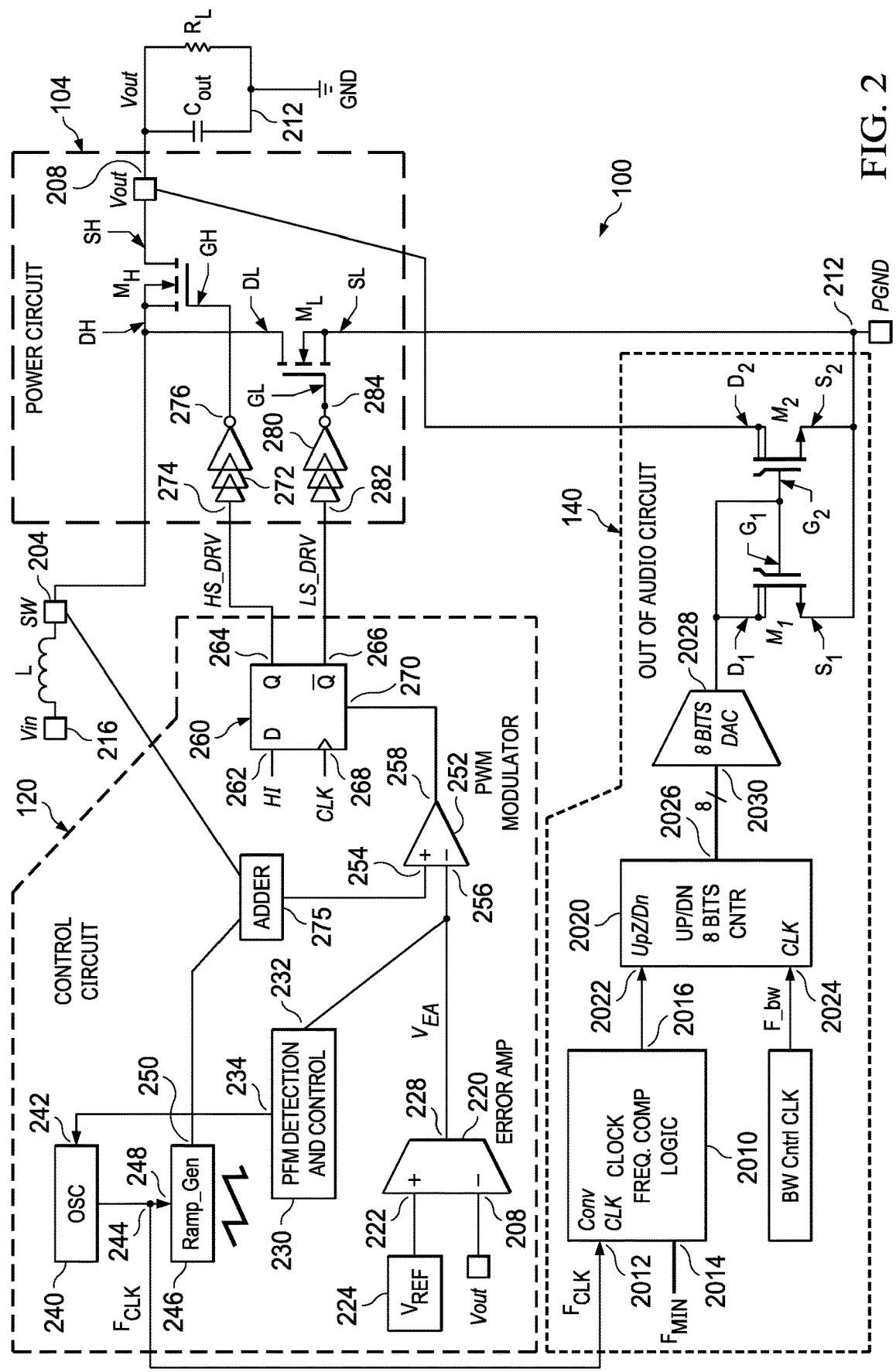
FIG. 2 is a schematic diagram of a DC-DC regulator system of an example embodiment.

FIG. 2 is a schematic diagram of the DC-DC regulator system 100 of an example embodiment. The regulator system 100 includes the power circuit 104 which includes: (a) a high-side switch $M_H$ coupled between a switching terminal 204 and an output terminal 208; and (b) a low-side switch $M_L$ coupled between the switching terminal 204 and a ground terminal 212. The output terminal 208 provides a regulated output voltage Vout. The ground terminal 212 can be coupled to a ground potential. An inductor L is coupled between an input voltage terminal 216 and the switching terminal 204. The input voltage terminal 216 may be coupled to an input voltage Vin. A capacitor $C_{out}$ is coupled between the output terminal 208 and the ground terminal 212. Also, a load represented by a resistor $R_L$ is coupled between the output terminal 208 and the ground terminal 212. The power circuit 104 may be implemented on a signal semiconductor die (either with or without the control circuit 120 and/or the out-of-audio circuit 140). The control circuit 120 and the out-of-audio circuit 140 may be implemented on a single semiconductor die or they may be included on separate semiconductor die.

The power circuit 104 includes a high-side drive circuit 272 which has an input 274 coupled to receive a high-side control signal (such as a PWM signal). The high-side drive circuit 272 is configured to provide a high-side gate drive signal at an output 276. The high-side gate drive signal is applied to drive the high-side switch $M_H$. The power circuit 104 includes a low-side drive circuit 280 which has an input 282 coupled to receive a low-side control signal (such as a PWM signal). The low-side drive circuit 280 is configured to provide a low-side gate drive signal at an output 284. The low-side gate drive signal is applied to drive the low-side switch $M_L$. In some example embodiments, the low-side switch and the high-side switch are not turned on at the same time.

The control circuit 120 provides control signals to the power circuit 104 to drive the power circuit 104. The control circuit 120 includes an error control circuit 220 (such as an error amplifier) which has a first input 222 coupled to a reference voltage terminal 224 and a second input 226 coupled to the output voltage terminal 208. The reference voltage terminal 224 can be coupled to a reference voltage Vref. The error control circuit 220 has an output 228. Responsive to the output voltage Vout and the reference voltage Vref, the error control circuit 220 provides an error signal at the output 228. The error control circuit 220 is implemented with an operational transconductance amplifier (OTA) in an example embodiment.

The control circuit 120 includes a frequency control circuit 230 which has an input 232 coupled to receive the error signal and an output 234. The frequency control circuit 230 is configured to provide a frequency control signal at the output 234 responsive to the error signal.

The control circuit 120 includes an oscillator 240 which has an input 242 coupled to receive the frequency control signal and has an output 244. The oscillator 240 is configured to provide a converter clock signal $F_{CLK}$ responsive to the frequency control signal.

The control circuit 120 includes a ramp generator 246 which has an input 248 coupled to receive $F_{CLK}$. The ramp generator 248 provides a ramp signal (that is based, in some example embodiments, on $F_{CLK}$) at an output 250.

The control circuit 120 includes a modulator circuit 252 which has a first input 254 coupled to receive the ramp signal and a second input 256 coupled to receive the error signal. In an example embodiment, an adder 275 can be coupled between the switching terminal 204 and the first input 254 of the modulator circuit 252. The adder 275 adds a current feedback signal from the switching terminal 204 to the ramp signal, and the sum of the ramp signal and the current feedback signal is applied to the first input 254 of the modulator circuit 252. The modulator circuit 252 is configured to provide a PWM signal at an output 258.

The control circuit 120 includes a latch 260 which has an input 262 ("D"), an output 264 ("Q"), an inverted output 266 ("Q-bar"), a rising-edge triggered clock input 268, and a reset input 270. The input 262 is coupled to a logic high signal, the rising-edge triggered clock input 268 is coupled to the output of the oscillator 240 to receive $F_{CLK}$. The reset input 270 is coupled to the output of the modulator circuit 252 to receive the PWM signal. The latch 260 is configured to provide the high-side control signal (in some example embodiments it's a PWM signal) at the output 264 and to provide the low-side control signal (in some example embodiments it's a PWM signal) at the inverted output 266. The high-side PWM signal is applied to the input 274 of the high-side drive circuit 272, and the low-side PWM signal is applied to the input 282 of the low-side drive circuit 280. In response, the high-side drive circuit 272 provides the high-side gate drive signal to the high-side switch $M_H$, and the low-side drive circuit 280 provides the low-side gate drive signal to the low-side switch $M_L$. In an example embodiment, the latch 260 is a D flip-flop.

In an example embodiment, the high-side switch $M_H$ is an n-channel field effect transistor (NFET) which has a drain $D_H$, a source $S_H$ and a gate $G_H$. The drain $D_H$ is coupled to the switching terminal 204, the source $S_H$ is coupled to the output terminal 208, and the gate $G_H$ coupled to receive the high-side drive signal. In other example embodiments, high-side switch $M_H$ is an p-channel field effect transistor (pFET), a junction transistor, a bipolar transistor, a drain-extended FET, an laterally-diffused metal-oxide-silicon field effect transistor (LDMOSFET) or other similar type of switching device.

The low-side switch $M_L$ is also an NFET which has a drain $D_L$, a source $S_L$ and a gate $G_L$. The drain $D_L$ is coupled to the switching terminal 204, the source $S_H$ is coupled to the ground terminal 212, and the gate $G_L$ is coupled to receive the low-side gate drive signal. In other example embodiments, side-side switch $M_H$ is an p-channel field effect transistor (pFET), a junction transistor, a bipolar transistor, a drain-extended FET, an laterally-diffused metal-oxide-silicon field effect transistor (LDMOSFET) or other similar type of switching device. In other embodiments, the low-side switch is implemented with a transistor of a conductivity type opposite that of the high-side switch (such as the pFET when the high-side switch is an nFET) and a single driver circuit is used to drive both switches).

In operation, $M_H$ is turned on when the high-side gate drive signal is a high voltage and is turned off when the high-side gate drive signal is a low voltage. Similarly, $M_L$ is turned on when the low-side gate drive signal is a high voltage and is turned off when the low-side gate drive signal is a low voltage.

In one example embodiment, $M_L$ is ON and $M_H$ is OFF during a first phase. Thus, Vin is coupled to the switching terminal 204, and the current in the inductor L rises and flows through $M_L$ to the ground. During the first phase, the load $R_L$ and the capacitor $C_{out}$ are electrically disconnected from Vin. In this phase, energy is stored in the inductor.

In a second phase, $M_H$ is ON and $M_L$ is OFF. Thus, the switching terminal 204 is coupled to the output terminal 208, and the current in the inductor L flows through the capacitor $C_{out}$ and through the load $R_L$. During the second phase, the inductor current charges $C_{out}$ and provides current to the load $R_L$.

When the operation switches back to the first phase, the load $R_L$ and the capacitor $C_{out}$ are again electrically disconnected from Vin. During the first phase, the capacitor $C_{out}$ supplies current to the load $R_L$. Thus, when $M_L$ is ON, the capacitor $C_{out}$ provides the current to compensate for the imbalance due to the current required to drive the load $R_L$.

The out-of-audio circuit 140 includes a frequency comparison circuit 2010 which has a first input 2012 coupled to receive the converter clock signal $F_{CLK}$ and a second input 2014 coupled to receive the minimum threshold frequency signal $F_{MIN}$. The frequency comparison circuit 2010 is configured to provide a logic high voltage at an output 2016 if the frequency of $F_{CLK}$ is lower than the frequency of $F_{MIN}$ and to provide a logic low voltage at the output if the frequency of $F_{CLK}$ is higher than the frequency of $F_{MIN}$. The minimum threshold frequency signal $F_{MIN}$ can be generated by an external clock or can be generated internally inside an integrated circuit. As described before, the frequency of $F_{MIN}$ is selected to ensure that the system 100 operates above audio frequency range.

The out-of-audio circuit 140 includes a counter 2020 which has a first input 2022 coupled to the output 2016 of the frequency comparison circuit and has a rising-edge clock-triggered input 2024 coupled to receive the bandwidth control clock signal $F_{BW}$. The bandwidth control clock signal $F_{BW}$ can be generated by an external clock or can be generated internally inside an integrated circuit. As described before, the frequency of $F_{BW}$ is selected to maintain a separation between the first bandwidth and the second bandwidth. The counter 2020 is configured provide a count value CNT-VAL at an output 2026 (in some example embodiments, output 2026 is an n-bit wide bus—shown as 8-bits wide in FIG. 2). The counter 2020 is configured to increment the count value CNT-VAL responsive to the logic high voltage and to decrement the count value CNT-VAL responsive to the logic low voltage. The frequency at which the counter 2020 increments or decrements CNT-VAL is based on the frequency of $F_{BW}$. In an aspect, the frequency of $F_{BW}$ is selected to be significantly lower than the frequency at which the control circuit 120 operates. As a result, the counter 2020 operates at a slower rate than the control circuit 120.

The out-of-audio circuit 140 includes a digital-to-analog converter 2028 which has an input 2030 coupled to receive the count value CNT-VAL. The digital-to-analog converter 2028 provides a gate signal which is an analog representation of the digital CNT-VAL.

In an example embodiment, the counter 2020 is an 8-bit UP/DOWN counter configured to provide an 8-bit CNT-VAL, and the digital-to-analog converter (DAC) 2028 is an 8-bit DAC configured to provide the gate signal responsive to CNT-VAL.

The out-of-audio circuit 140 includes a first NFET M1. The drain D1 is coupled to the gate G1, the gate G1 and the drain D1 are coupled to receive the gate signal, and the source S1 is coupled to the ground terminal 212. The out-of-audio control circuit 140 includes a second NFET M2. The drain D2 is coupled to the output terminal 208, and the gate G2 is coupled to receive the gate signal, and the source S2 is coupled to the ground terminal 212.

The first and second NFETs M1 and M2 are coupled in a current mirror configuration in which the NFET M1 mirrors a current through the NFET M2. By applying the gate signal to the gates G1 and G2, the out-of-audio circuit 140 pulls current from the output terminal 208.

In operation, if current continues to flow in the inductor L, the regulator system 100 operates in a continuous conduction mode (CCM). In CCM, the high-side switch $M_H$ and the low-side switch $M_L$ are operated at a fixed frequency but in a complementary way: when $M_H$ in ON, $M_L$ is OFF, and when $M_H$ is OFF, $M_L$ is ON. The modulator circuit 252 varies the pulse width of the PWM signal, which varies the duty cycles of MH and $M_L$ to regulate the output voltage Vout. If current in the inductor L goes to zero, the regulator system 100 operates in a discontinuous conduction mode (DCM) (in DCM, MH and ML are both turned OFF for a period of time).

If current drawn by the load $R_L$ drops below a minimum threshold load current, the regulator system 100 switches to a pulse frequency modulation (PFM) mode in which both the converter clock frequency $F_{CLK}$ frequency and the duty cycles of $M_H$ and $M_L$ are varied. As the current drawn by the load $R_L$ drops below the minimum threshold load current, the voltage at the output terminal 208 rises. To reduce the output voltage Vout, $F_{CLK}$ is reduced and current is drawn from the output voltage terminal 208 by the NFET M2.

Conversely, if current drawn by the load $R_L$ rises, the output voltage Vout falls. To increase the output voltage Vout, $F_{CLK}$ is increased and less current is drawn from the output voltage terminal 208.

In one aspect, the out-of-audio circuit 140 is configured to compare the converter clock signal $F_{CLK}$ to the minimum threshold frequency signal $F_{MIN}$. If the frequency of $F_{CLK}$ is lower than the frequency of $F_{MIN}$, the frequency comparison circuit 2010 provides a logic high voltage, which causes the counter 2020 to increment the count value, which in turn increases the voltage of the gate signal (i.e., output of the digital-to-analog converter 208). As a result, the current mirror formed by M1 and M2 pulls more current from the output terminal 208, which in turn reduces the output voltage Vout. Thus, the current mirror acts as a current sink which draws current from the output terminal 208. As the output voltage Vout drops, the control circuit 120 responds by increasing the frequency of $F_{CLK}$ to regulate the output voltage Vout. When the frequency of $F_{CLK}$ is increased, the power circuit 104 supplies more current to the output 116, which causes the output voltage Vout to rise.

Conversely, if the frequency of $F_{CLK}$ is higher than the frequency of $F_{MIN}$, the frequency comparison circuit 2010 provides a logic low voltage, which causes the counter 2020 to decrement the count value, which in turn decreases the gate signal (i.e., output of the digital-to-analog converter 208). As a result, the current mirror formed by M1 and M2 pulls less current from the output voltage terminal 208, which in turn causes the output voltage Vout to rise. As Vout rises, the control circuit 120 responds by reducing the frequency of $F_{CLK}$ to regulate the output voltage Vout. When $F_{CLK}$ is reduced, the power circuit 104 supplies less current to the output 116, which causes the output voltage Vout to decrease. If $F_{CLK}$ remains higher than $F_{MIN}$, the count value CNT-VAL is reduced down to zero in which case the current mirror ceases to pull current from the output terminal 208.

The counter 2020 is configured to increment or decrement the count value CNT-VAL responsive to the bandwidth control clock $F_{BW}$. To ensure stability of the regulator system 100, the frequency of the bandwidth control clock $F_{BW}$ is set significantly lower than the frequency at which the control circuit 120 operates. In an example embodiment, $F_{BW}$ is set at 1 KHz while $F_{CLK}$ is set at 20 KHz or higher. Thus, the counter 2020 does not respond instantaneously to the frequency comparison circuit 2010, but rather at much slower rate. As a result, there is a wide separation between the bandwidth of the out-of-audio circuit 140 and the bandwidth of the control circuit 120. Furthermore, by setting $F_{MIN}$ higher than audio frequencies, the regulator system 100 is operated at frequencies above audio frequency range.

In an additional aspect, the NFETs M1 and M2 function as an adaptive load which draws current from the output terminal 208, thus regulating the output voltage. If current drawn by the load drops, the output voltage rises, and in response the control circuit 120 reduces the converter clock frequency $F_{CLK}$ which causes less current to be supplied to the output and the current mirror (formed by M1 and M2) increases the amount of current pulled from the output 208. If current drawn by the load rises, the output voltage drops, and in response the control circuit 120 increases the converter frequency to supply more current and the current mirror reduces the amount of current pulled from the output 208. By regulating the converter frequency, the efficiency of the system is improved.

Figure 3:
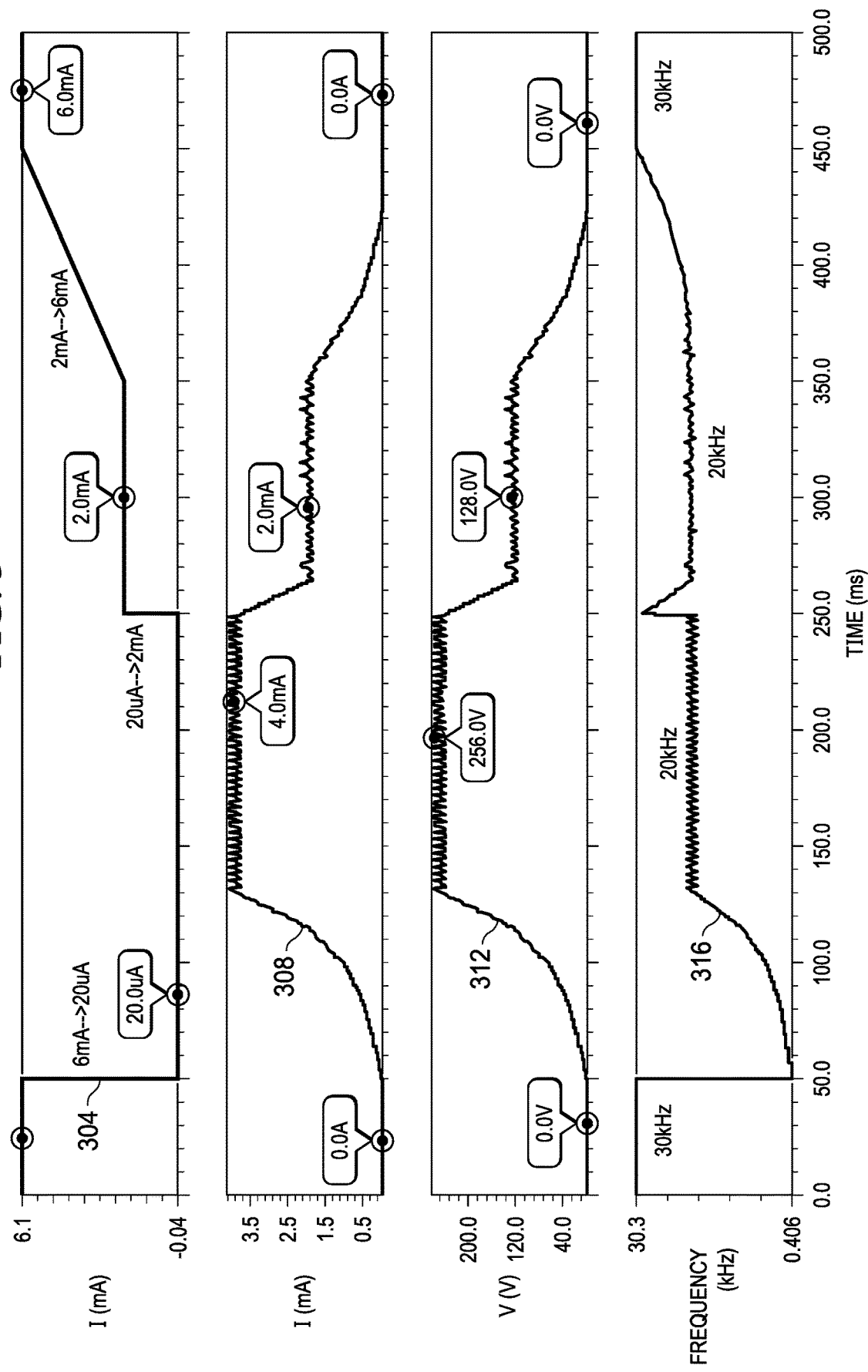
FIG. 3 illustrates timing diagrams of waveforms generated by the regulator system.

FIG. 3 illustrates timing diagrams of waveforms generated by the regulator system 100. Graph 304 illustrates the load current (shown in milliAmps); graph 308 illustrates the current drawn from the output 208 by the current mirror formed by $M_1$ and $M_2$; graph 312 illustrates the digital code output of the DAC; and graph 316 illustrates $F_{CLK}$. In this example embodiment, the input voltage Vin=9V and the output voltage Vout=16V. At time T=0, the load $R_L$ draws 6 mA current (304), the current mirror pulls 0A current (308) from the output of the regulator system, and the output (312) of the DAC is zero. At time T=0, the converter clock frequency (316) is 30 kHz.

At time T=50 ms, the current (304) drawn by the load $R_L$ drops from 6 mA to 20 µA, the converter clock frequency (316) drops from 30 kHz to around 400 Hz, and accordingly the current (308) pulled by the current mirror increases from 0 to 3.98 mA.

At time T=50 ms the current (308) drawn by the current mirror begins to rise and the converter clock frequency (316) drops to several hundred Hertz. At T=130 ms, the current (308) rises to 3.98 mA and the converter clock frequency (316) increases to a target or desired frequency of 20 kHz. During this time, the load current (304) remains very low (e.g. around 20 µA).

At T=250 ms, the current (304) drawn by $R_L$ increases to 2 mA, the current (308) pulled by the current mirror gradually decreases to 2 mA. The converter clock frequency (316) spikes upward but settles at 20 kHz. The upward spike in the converter clock frequency (316) is caused by the increase in the load current. When the load current increases from 20 µA to 2 mA, the regulator system 100 responds by increasing the frequency to support higher current required by the load $R_L$. As a consequence, the out-of-audio circuit 140 gradually reduces the current pulled from the output which causes the frequency to settle back at 20 kHz.

From t=350 ms to 450 ms, the current (304) drawn by $R_L$ ramps up to 6 mA, and accordingly the current (308) pulled by the current mirror ramps down to 0, and the converter clock frequency (310 increases back to 30 kHz.

In the foregoing discussion and in the claims, the terms "including" and "comprising" are used in an open-ended fashion, and thus should be interpreted to mean "including, but not limited to . . . ." An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "approximately" preceding a value means+/−10 percent of the stated value. As used herein, the term "modulate" shall also mean "to vary" or "to change." The terms "node", "terminal", "pin" and "interconnection", for example, are interchangeably used and referred to any connection (or interconnection) between features. These terms are not meant to be limiting with respect to a certain type of physical structure. For example, the "terminals" of a circuit element are meant to be each connection to such circuit element. Hence, an integrated resistor would be referred to have two terminals (ends) even though these "terminals" are just the two connections to the integrated resistor.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A DC-DC regulator system, comprising:
   a power circuit having a first input, a second input and an output;
   a control circuit having a first input coupled to the output of the power circuit, a second input, a first output and a second output; and
   an out-of-audio circuit having a first input, a second input coupled to the second output of the control circuit, a third input coupled to the output of the power circuit, and a fourth input;
   wherein the out-of-audio circuit comprises:
   a frequency comparison circuit having a first input coupled to the second output of the control circuit and a second input coupled to the first input of the out-of-audio circuit; and
   a counter having a first input coupled to an output of the frequency comparison circuit and having a second input coupled to receive a bandwidth control clock signal;
   wherein the frequency comparison circuit is configured to provide a logic high voltage at the output of the frequency comparison circuit when a frequency of a converter clock signal is lower than a minimum threshold frequency and to provide a logic low voltage at the output of the frequency comparison circuit when the frequency of the converter clock signal is higher than the minimum threshold frequency;
   wherein the counter is configured to provide a count value at an output of the counter responsive to the bandwidth control clock signal, and wherein the counter is configured to increment the count value responsive to the logic high voltage and to decrement the count value responsive to the logic low voltage.

2. The DC-DC regulator system of claim 1, wherein the out-of-audio circuit further comprises a digital-to-analog converter having an input coupled to the output of the counter and an output.

3. The DC-DC regulator system of claim 2, wherein the out-of-audio circuit further comprises:
   a first NFET having a drain, a source, and a gate, the drain is coupled to the gate, the gate and the drain are coupled to the output of the digital-to-analog converter and the source is coupled to a ground terminal; and
   a second NFET having a drain, a source, and a gate, the drain is coupled to the output of the power circuit, and the gate is coupled to the output of the digital-to-analog converter, and the source is coupled to the ground terminal.

4. The DC-DC regulator system of claim 3, wherein the second NFET is configured to mirror a current through the first NFET.

5. The DC-DC regulator system of claim 4, wherein the out-of-audio circuit is configured to control a current through the first NFET and a current through the second NFET by coupling the output of the digital-to-analog converter to the first and second NFETs.

6. The DC-DC regulator system of claim 3, wherein the out-of-audio circuit is configured to draw a portion of current from the output of the power circuit by applying a gate signal to the first and second NFETs.

7. A DC-DC regulator system, comprising:
   a power circuit having a first input, a second input and an output;
   a control circuit configured to have a first bandwidth and have a first input coupled to the output of the power circuit, a second input, a first output, and a second output; and
   an out-of-audio circuit configured to have a second bandwidth and have a first input, a second input, a third input coupled to the output of the power circuit, and a fourth input;
   wherein the out-of-audio circuit comprises a counter having a first input coupled to an output of a frequency comparison circuit and having a second input coupled to receive a bandwidth control clock signal;
   wherein the out-of-audio circuit further comprises the frequency comparison circuit having a first input coupled to the second output of the control circuit and a second input coupled to receive a minimum threshold frequency signal, the frequency comparison circuit configured to provide a logic high voltage at the output of the frequency comparison circuit when a frequency of a converter clock signal is lower than the minimum threshold frequency signal and to provide a logic low voltage at the output of the frequency comparison circuit when the frequency of the converter clock signal is higher than the minimum threshold frequency signal;
   wherein the counter is configured provide a count value at an output of the counter, and wherein the counter is configured to increment the count value responsive to the logic high voltage and to decrement the count value responsive to the logic low voltage.

8. The DC-DC regulator system of claim 7, wherein the out-of-audio circuit further comprises a digital-to-analog converter having an input coupled to the output of the counter and an output.

9. The DC-DC regulator system of claim 8, wherein the out-of-audio circuit further comprises:
- a first NFET having a drain, a source, and a gate, the drain is coupled to the gate, the gate and the drain are coupled to the output of the digital-to-analog converter, and the source is coupled to a ground terminal; and
- a second NFET having a drain, a source, and a gate, the drain is coupled to the output of the power circuit, the gate is coupled to the output of the digital-to-analog converter, and the source is coupled to the ground terminal.

10. The DC-DC regulator system of claim 9, wherein the first NFET is configured to mirror a current through the second NFET.

11. The DC-DC regulator system of claim 9, wherein the out-of-audio circuit is configured to control a current through the first NFET and a current through the second NFET by coupling the output of the digital-to-analog converter to the first and second NFETs.

12. The DC-DC regulator system of claim 9, wherein the out-of-audio circuit is configured to regulate a portion of current from the output of the power circuit by coupling the output of the digital-to-analog converter to the first and second NFETs.

* * * * *